(12) United States Patent
Brigandi

(10) Patent No.: US 10,501,645 B2
(45) Date of Patent: Dec. 10, 2019

US010501645B2

(54) SEMICONDUCTIVE SHIELD COMPOSITION

(71) Applicant: Union Carbide Chemicals & Plastics Technology LLC, Midland, MI (US)

(72) Inventor: Paul J. Brigandi, Collegeville, PA (US)

(73) Assignee: UNION CARBIDE CHEMICALS & PLASTICS TECHNOLOGY, Midland, MI (US)

( * ) Notice: Subject to any disclaimer, the term of this patent is extended or adjusted under 35 U.S.C. 154(b) by 0 days.

(21) Appl. No.: 15/765,624

(22) PCT Filed: Sep. 29, 2016

(86) PCT No.: PCT/US2016/054401
§ 371 (c)(1),
(2) Date: Apr. 3, 2018

(87) PCT Pub. No.: WO2017/062255
PCT Pub. Date: Apr. 13, 2017

(65) Prior Publication Data
US 2018/0298205 A1 Oct. 18, 2018

Related U.S. Application Data

(60) Provisional application No. 62/238,272, filed on Oct. 7, 2015.

(51) Int. Cl.
| | |
|---|---|
| C09D 5/24 | (2006.01) |
| C08K 3/04 | (2006.01) |
| C08K 5/13 | (2006.01) |
| C08K 5/14 | (2006.01) |
| C08L 9/02 | (2006.01) |
| C08L 23/08 | (2006.01) |
| C09D 5/08 | (2006.01) |
| C09D 5/20 | (2006.01) |
| C09D 123/08 | (2006.01) |
| H01B 3/28 | (2006.01) |
| H01B 3/44 | (2006.01) |
| H01B 9/02 | (2006.01) |

(52) U.S. Cl.
CPC ............... *C09D 5/24* (2013.01); *C08K 3/04* (2013.01); *C08K 5/13* (2013.01); *C08K 5/14* (2013.01); *C08L 9/02* (2013.01); *C08L 23/0853* (2013.01); *C09D 5/086* (2013.01); *C09D 5/20* (2013.01); *C09D 123/0853* (2013.01); *H01B 3/28* (2013.01); *H01B 3/441* (2013.01); *H01B 3/446* (2013.01); *H01B 9/027* (2013.01); *C08L 2203/202* (2013.01)

(58) Field of Classification Search
CPC . C09D 5/24; C09D 5/086; C09D 5/20; C09D 123/0853; H01B 3/28; H01B 3/441; H01B 3/446; H01B 9/027
See application file for complete search history.

(56) References Cited

U.S. PATENT DOCUMENTS

| | | | |
|---|---|---|---|
| 2,115,207 A | * | 4/1938 | Milas |
| 4,150,193 A | * | 4/1979 | Burns, Jr. ............... H01B 1/24 174/102 SC |
| 4,226,823 A | | 10/1980 | Jansson et al. |
| 4,246,142 A | | 1/1981 | Ongchin |
| 4,286,023 A | | 8/1981 | Ongchin |
| 4,412,938 A | | 11/1983 | Kakizaki et al. |
| 5,246,783 A | | 9/1993 | Spenadel et al. |
| 6,291,772 B1 | * | 9/2001 | Easter et al. |
| 6,496,629 B2 | | 12/2002 | Ma et al. |
| 6,714,707 B2 | | 3/2004 | Rossi et al. |
| 6,858,296 B1 | | 2/2005 | Mendelsohn et al. |
| 6,972,099 B2 | | 12/2005 | Easter |
| 7,767,299 B2 | | 8/2010 | Easter |
| 8,080,735 B2 | | 12/2011 | Chaudhary et al. |
| 8,889,992 B2 | | 11/2014 | Han et al. |
| 2004/0104335 A1 | | 6/2004 | Sakaguchi |
| 2006/0182961 A1 | | 8/2006 | Person et al. |
| 2008/0227887 A1 | * | 9/2008 | Klier et al. |
| 2009/0011318 A1 | | 1/2009 | Sasaki et al. |
| 2010/0036031 A1 | * | 2/2010 | Herbst ............... C08K 5/00 524/331 |
| 2011/0114365 A1 | * | 5/2011 | Torgersen et al. |
| 2013/0062096 A1 | * | 3/2013 | Han et al. |
| 2013/0178570 A1 | * | 7/2013 | Brigandi |
| 2013/0178726 A1 | * | 7/2013 | Wang ............... C08K 5/13 600/347 |
| 2014/0011029 A1 | * | 1/2014 | Brigandi |
| 2014/0079952 A1 | * | 3/2014 | Culligan |
| 2014/0193744 A1 | * | 7/2014 | Akinaga et al. |

FOREIGN PATENT DOCUMENTS

EP          0420271 A1     4/1991

* cited by examiner

*Primary Examiner* — Timothy J Thompson
*Assistant Examiner* — Rhadames Alonzo Miller
(74) *Attorney, Agent, or Firm* — Quarles & Brady LLP

(57) ABSTRACT

A wire or cable comprising an insulation layer and a semiconducting shield layer over and in contact with the insulation layer and strippable from the insulation layer, the second semiconducting shield layer made from the composition comprising: (A) 45-52% ethylene vinyl acetate (EVA) comprising 28-45% units derived from vinyl acetate (VA) based on the weight of the EVA; (B) 30-45% carbon black having (1) 80-1 15 milliliters per 100 grams (ml/100 g) DBP absorption value, (2) 30-60 milligrams per gram (mg/g) iodine absorption (I2NO), and (3) 0.3-0.6 grams/milliliter (g/ml) apparent density; (C) 5-20% acrylonitrile butadiene rubber (NBR) comprising 25-55% units derived from acrylonitrile (AN) based on the weight of the NBR; (D) 0.2-2% phenolic antioxidant; and (E) 0.5-2% organic peroxide.

14 Claims, No Drawings

SEMICONDUCTIVE SHIELD COMPOSITION

FIELD OF THE INVENTION

This invention relates to wire and cable. In one aspect, the invention relates to insulated wire and cable while in another aspect, the invention relates to strippable insulated wire and cable.

BACKGROUND OF THE INVENTION

In general, a typical cable for power distribution comprises one or more conductors in a cable core that is covered by layers of polymeric materials including a first semiconducting shield layer (also known as a conductor shield or a strand shield); an insulation layer, usually crosslinked polyethylene (XLPE) or ethylene propylene rubber (EPR); a second or outer semiconducting shield layer (also known as an insulation shield); a wire shield, e.g., a metallic tape layer; and a protective jacket. The second semiconducting shield layer can be either bonded to the insulation layer, or it can be strippable from the insulation layer, with most power cable applications using a second semiconducting shield layer that is strippable from the insulation layer.

The current technology for cables comprising a second semiconducting shield layer that is strippable from the insulation layer is illustrated by such publications as U.S. Pat. Nos. 4,286,023, 6,858,296 and 8,889,992; EP 0 420 271 A1 and EP 1 420 271 A1; and WO 2009/042364A1 and WO 2004/088674 A. These publications teach second semiconducting shield compositions that comprise an (1) ethylene vinyl acetate copolymer (EVA) with a vinyl acetate (VA) comonomer content of 33%; (2) an acrylonitrile-butadiene rubber (NBR); (3) carbon black; (4) hindered amine type antioxidants; and (5) an organic peroxide. Second semiconducting shields made from these compositions typically have a strip force of greater than (>) 15 pounds per one-half inch (lb/0.5") over a commercially available insulation layer made from EPR.

There is a continuing interest in reducing the adhesion required to remove the second semiconducting shield layer from the insulation layer to improve the ease of cable installations.

SUMMARY OF THE INVENTION

In one embodiment the invention is a composition comprising in weight percent based on the weight of the composition:
- (A) 45-52% ethylene vinyl acetate (EVA) comprising 28-45% units derived from vinyl acetate (VA) based on the weight of the EVA;
- (B) 30-45% carbon black having
  - (1) 80-115 milliliters per 100 grams (ml/100 g) DBP absorption value,
  - (2) 30-60 milligrams per gram (mg/g) iodine absorption (I2NO), and
  - (3) 0.3-0.6 grams/milliliter (g/ml) apparent density;
- (C) 5-20% acrylonitrile butadiene rubber (NBR) comprising 25-55% units derived from acrylonitrile (AN) based on the weight of the NBR;
- (D) 0.2-2% phenolic antioxidant; and
- (E) 0.5-2% organic peroxide.

In one embodiment the invention is a wire or cable comprising an insulation layer and a semiconducting shield layer over and in contact with the insulation layer, the second semiconducting shield layer made from the composition described in the preceding paragraph.

In one embodiment the invention is a wire or cable comprising:
- (a) a conductor;
- (b) a first semiconducting shield layer over and in contact with the conductor;
- (c) an insulation layer over and in contact with the first semiconducting shield layer;
- (d) a second semiconducting shield layer over and in contact with the insulation layer, the second semiconducting shield layer made from the composition described above;
- (e) a wire shield over the second semiconducting shield layer; and
- (f) a protective jacket.

DETAILED DESCRIPTION OF THE PREFERRED EMBODIMENT

Definitions

Unless stated to the contrary, implicit from the context, or customary in the art, all parts and percents are based on weight and all test methods are current as of the filing date of this disclosure. For purposes of United States patent practice, the contents of any referenced patent, patent application or publication are incorporated by reference in their entirety (or its equivalent US version is so incorporated by reference), especially with respect to the disclosure of definitions (to the extent not inconsistent with any definitions specifically provided in this disclosure) and general knowledge in the art.

The numerical ranges disclosed herein include all values from, and including, the lower and upper value. For ranged containing explicit values (e.g., 1 or 2; or 3 to 5; or 6; or 7), any subrange between any two explicit values is included (e.g., 1 to 2; 2 to 6; 5 to 7; 3 to 7; 5 to 6; etc.).

"DBP" and like terms mean dibutyl phthalate.

"Wire" and like terms refer to a single strand of conductive metal, e.g., copper or aluminum, or a single strand of optical fiber.

"Cable," "power cable," "transmission line" and like terms refer to at least one wire or optical fiber within a protective insulation, jacket or sheath. Typically, a cable is two or more wires or optical fibers bound together, typically in a common protective insulation, jacket or sheath. The individual wires or fibers inside the jacket may be bare, covered or insulated. Combination cables may contain both electrical wires and optical fibers. The cable, etc. can be designed for low, medium and high voltage applications. Typical cable designs are illustrated in U.S. Pat. Nos. 5,246,783, 6,496,629 and 6,714,707.

"Composition" and like terms mean a mixture or blend of two or more components.

"Polymer blend", "blend" and like terms mean a mixture of two or more polymers. Such a mixture may or may not be miscible. Such a mixture may or may not be phase separated. Such a mixture may or may not contain one or more domain configurations, as determined from transmission electron spectroscopy, light scattering, x-ray scattering, and any other method known in the art.

The term "polymer" (and like terms) is a macromolecular compound prepared by reacting (i.e., polymerizing) monomers of the same or different type. "Polymer" includes homopolymers and interpolymers.

"Interpolymer" means a polymer prepared by the polymerization of at least two different monomers. This generic term includes copolymers, usually employed to refer to polymers prepared from two different monomers, and polymers prepared from more than two different monomers, e.g., terpolymers, tetrapolymers, etc.

"Crosslinked", "cured" and similar terms mean that the polymer, before or after it is shaped into an article, was subjected or exposed to a treatment which induced crosslinking and has xylene or decalene extractables of less than or equal to 90 weight percent (i.e., greater than or equal to 10 weight percent gel content).

"Crosslinked polyolefin" and like terms includes and encompasses compositions derived from a crosslinkable polyethylene homopolymer or a crosslinkable ethylene copolymer such as ethylene-propylene rubber or ethylene-propylene-diene rubber.

Second Semiconductive Shield Composition

The second semiconductive shield layer, which is typically and preferably crosslinked, of this invention is made from a composition comprising, or consisting essentially of, or consisting of, in weight percent (wt %) based on the weight of the composition:
  (A) 45-52, or 46-51, or 47-50, % ethylene vinyl acetate (EVA) comprising 28-45% units derived from vinyl acetate (VA) based on the weight of the EVA;
  (B) 30-45, or 32-43, or 34-41, % carbon black having:
    (1) 80-115 milliliters per 100 grams (ml/100 g) DBP absorption value,
    (2) 30-60 milligrams per gram (mg/g) iodine absorption (I2NO), and
    (3) 0.3-0.6, grams/milliliter (g/ml) apparent density;
  (C) 5-20, or 8-19, or 11-18, % acrylonitrile butadiene rubber (NBR) comprising 25-55% units derived from acrylonitrile (AN) based on the weight of the NBR;
  (D) 0.2-2, or 0.3-1.5, or 0.4-1.0, % phenolic antioxidant; and
  (E) 0.5-2, or 0.6-1.7, or 0.7-1.4, % organic peroxide.

Ethylene Vinyl Acetate (EVA)

Ethylene vinyl acetate (EVA) is a well-known polymer that is readily available commercially, e.g., ELVAX™ EVA resins available from DuPont; ESCORENE™ Ultra EVA resins available from ExxonMobil; and EVATANE™ EVA resins available from Arkema. The vinyl acetate content of the EVA resins used in the practice of this invention can range widely, but typically the minimum vinyl acetate content is at least 28, more typically at least 30 and even more typically at least 31, wt %. The maximum vinyl acetate content of the EVA resins used in the practice of this invention can also range widely, but typically it is not greater than 45, more typically not greater than 42 and even more typically not greater than 40, wt %.

Carbon Black

The carbon blacks that can be used in the practice of this invention have the following properties:
  (1) 80-115, or 85-110, or 90-105, milliliters per 100 grams (ml/100 g) DBP absorption value,
  (2) 30-60, or 35-55, or 40-50, milligrams per gram (mg/g) iodine absorption (I2NO), and
  (3) 0.3-0.6, or 0.35-0.55, or 0.40-0.50, grams/milliliter (g/ml) apparent density.

Representative example of carbon black include ASTM grade N550. Carbon black also includes furnace black, acetylene black, thermal black, lamb black and Ketjen black. Generally, smaller particle sized carbon blacks are employed to the extent cost considerations permit. In one embodiment the carbon black is conductive furnace black. In one embodiment the conductive carbon can be selected from carbon fiber, carbon nanotubes, fullerene, graphites and expanded graphite platelets. Mixtures of carbon blacks having the properties described above can also be used in the practice of this invention.

Acrylonitrile Butadiene Rubber (NBR)

The vulcanizable butadiene-acrylonitrile copolymers (rubbers) and methods for their preparation are well known in the art. Such copolymers are commonly referred to in the art as nitrile rubber or simply NBR. The butadiene-acrylonitrile copolymers employed in this invention can contain 25-55, or 30-50, or 35-45, wt % of acrylonitrile based on the total weight of the copolymer. Of course, if desired, mixtures of such copolymers having different weight percents of acrylonitrile can also be employed.

Phenolic Antioxidant

Any phenolic-based compound that will minimize the oxidation that can occur during the processing of the strippable semiconductive insulation shield can be used as the antioxidant in the compositions of this invention. Examples of such antioxidants include, but are not limited to, hindered phenols such as 2,2'-methylenebis(6-tert-butyl-4-methylphenol); tetrakis[methylene(3,5-di-tert-butyl-4-hydroxyhydro-cinnamate)]methane; bis[(beta-(3,5-ditert-butyl-4-hydroxybenzyl)-methyl-carboxyethyl)]-sulphide; 4,4'-thiobis(3-methyl-6-tert-butyl-phenol); 4,4'-thiobis(2-methyl-6-tert-butylphenol); 4,4'-thiobis(2-tert-butyl-5-methylphenol); 2,2'-thiobis(4-methyl-6-tert-butylphenol); and thiodiethylene bis(3,5-di-tert-butyl-4-hydroxy)-hydrocinnamate. In one embodiment the phenolic antioxidant is 2,2'-methylenebis(6-tert-butyl-4-methylphenol). In one embodiment the phenolic antioxidant is 4,4'-thiobis(3-methyl-6-tert-butyl-phenol).

Organic Peroxide

Suitable organic peroxides, i.e., free radical initiators, used as crosslinking agents include, but are not limited to, the dialkyl peroxides and diperoxyketal initiators. These compounds are described in the *Encyclopedia of Chemical Technology*, third edition, Vol. 17, pp. 27-90 (1982). Mixtures of two or more free radical initiators may also be used together as the free radical initiator. In addition, free radicals can form from shear energy, heat or radiation.

In the group of dialkyl peroxides, nonlimiting examples of suitable free radical initiators are: dicumyl peroxide, di-t-butyl peroxide, t-butyl cumyl peroxide, 2,5-dimethyl-2,5-di(t-butylperoxy)-hexane, 2,5-dimethyl-2,5-di(t-amylperoxy)-hexane, 2,5-dimethyl-2,5-di(t-butylperoxy)hexyne-3, 2,5-dimethyl-2,5-di(t-amylperoxy)hexyne-3, α,α-di[(t-butylperoxy)-isopropyl]-benzene, di-t-amyl peroxide, 1,3,5-tri-[(t-butylperoxy)-isopropyl]benzene, 1,3-dimethyl-3-(t-butylperoxy)butanol, 1,3-dimethyl-3-(t-amylperoxy) butanol, and mixtures of two or more of these initiators.

In the group of diperoxyketal initiators, nonlimiting examples of suitable free radical initiators include: 1,1-di(t-butylperoxy)-3,3,5-trimethylcyclohexane, 1,1-di(t-butylperoxy)cyclo-hexane n-butyl, 4,4-di(t-amylperoxy)valerate, ethyl 3,3-di(t-butylperoxy)butyrate, 2,2-di(t-amylperoxy) propane, 3,6,6,9,9-pentamethyl-3-ethoxycarbonylmethyl-1,2,4,5-tetraoxacyclo-nonane, n-butyl-4,4-bis(t-butylperoxy)-valerate, ethyl-3,3-di(t-amylperoxy)-butyrate, and mixtures of two or more of these initiators.

Fillers and Other Additives

The second semiconductive shield compositions of this invention can be filled or unfilled. If filled, then the amount of filler present typically does not exceed an amount that would cause a large degradation of the electrical and/or mechanical properties of the composition. Typically, the amount of filler present is between 2 and 80, more typically between 5 and 70, weight percent (wt %) based on the weight of the composition. Representative fillers include kaolin clay, magnesium hydroxide, silica, calcium carbonate. The filler may or may not have flame retardant properties. In one embodiment of this invention in which filler is present, the filler is coated with a material that will prevent or retard any tendency that the filler might otherwise have to interfere with the function of the composition and/or the cure of the composition. Stearic acid is illustrative of such a filler coating.

The second semiconductive shield compositions of this invention can contain other additives as well, such as, for example, UV stabilizers, cling additives, light stabilizers (such as hindered amines), plasticizers (such as dioctylphthalate or epoxidized soy bean oil), thermal stabilizers, mold release agents, tackifiers (such as hydrocarbon tackifiers), waxes (such as polyethylene waxes), processing aids (such as oils, organic acids such as stearic acid, metal salts of organic acids), colorants or pigments to the extent that they do not interfere with desired physical or mechanical properties of the second semiconductive shield compositions of the present invention. These additives are used in known amounts and in known ways.

Preparation of the Second Semiconductive Shield Composition

Compounding of the second semiconductive shield compositions of this invention can be performed by standard means known to those skilled in the art. Examples of compounding equipment are internal batch mixers, such as a BANBURY™ or BOLLING™ internal mixer. Alternatively, continuous single or twin screw mixers can be used, such as a FARREL™ continuous mixer, a WERNER AND PFLEIDERER™ twin screw mixer, or a BUSS™ kneading continuous extruder. The type of mixer utilized, and the operating conditions of the mixer, can affect properties of the composition such as viscosity, volume resistivity, and extruded surface smoothness.

The compounding temperature for the second semiconductive shield compositions of this invention for a one-step process to include curatives is typically from the melting point of the lowest melting polymeric component of the composition interpolymer, e.g., 100° C. to 140° C., more typically from 105° C. to 120° C. The various components of the final composition can be added to and compounded with one another in any order, or simultaneously, but typically the polymeric components are first compounded with one another and then that blend along with any remaining components of the composition and any additives are compounded with one another. In a two-step compounding process, the intermediate formulation can be compounded from 100 to 250° C. without curatives followed by a peroxide soaking or blending process.

In some embodiments the additives are added as a premixed masterbatch. Such masterbatches are commonly formed by dispersing the additives, either separately or together, into an inert plastic resin or major component of the composition, e.g., the EVA and/or the NBR. Masterbatches are conveniently formed by melt compounding methods.

Strippable Wire or Cable

In one embodiment the invention is a wire or cable comprising an insulation layer and a semiconducting shield layer over and in contact with the insulation layer, the semiconducting shield layer made from a composition as described above from which the second semiconductive shield layer is prepared. The wire or cable can comprise one or more other components, e.g., one or more conductors, one or more insulation layers, one or more wire shields, additional semiconductive shields, a protective jacket, and the like.

In one embodiment the invention is a wire or cable comprising, or consisting essentially of, or consisting of:
(a) a conductor;
(b) a first semiconducting shield layer over and in contact with the conductor;
(c) an insulation layer over and in contact with the first semiconducting shield layer;
(d) a second semiconducting shield layer over and in contact with the insulation layer, the second semiconducting shield layer made from the composition of claim 1;
(e) a wire shield over the second semiconducting shield layer; and
(f) a protective jacket.

Conductor

In one embodiment, the conductor component of the wire or cable embodiment of this invention can generally comprise any suitable electrically conducting material, although generally electrically conducting metals are utilized. Preferably, the metals utilized are copper or aluminum. In power transmission, aluminum conductor/steel reinforcement (ACSR) cable, aluminum conductor/aluminum reinforcement (ACAR) cable, or aluminum cable is generally preferred.

In one embodiment, the conductor component of the wire or cable embodiment of this invention is a fiber optical strand or filament. In one embodiment, the conductor component of the cable embodiment of this invention is a combination of one or more metal conductors and one or more optical fibers. In those embodiments comprising more than one conductor, the conductors can be either separated from one another or intertwined, e.g., braided, with one another.

First Semiconductive Shield Layer

The first semiconductive shield layer is over and in contact with the conductor(s). The first semiconductive shield can be of the same or different composition as the second semiconductive shield. Since easy stripability of the first semiconductive shield layer from both the conductor and the insulation layer is typically undesirable, or at least not of a concern, typically the composition of the first conductive shield is different than that of the second semiconductive shield layer. In one embodiment, the strip force (as measured by the procedure described in the examples) of the first semiconductive shield layer is higher, typically much higher, e.g., 100% or more if removable at all, than the strip force of the second semiconductive shield layer. In one embodiment the composition form which the first semiconductive shield layer is prepared comprises a ethylene copolymer. In another embodiment, the composition from which the first semiconductive shield layer is prepared comprises a blend of crosslinked ethylene copolymer and other polyethylene.

Insulation Layer

In one embodiment the primary component of the insulation layer is a crosslinked polyolefin. In one embodiment the primary component of the insulation layer is a crosslinked ethylene-propylene-diene monomer rubber. In one embodiment the primary component of the insulation layer is a crosslinked ethylene homopolymer or copolymer. Ethylene homopolymers include high pressure low density polyethylene (HPLDPE), linear low density polyethylene (LLDPE), and high density polyethylene (HDPE). Ethylene copolymers include ethylene/α-olefin (e.g., propylene, 1-butene, 1-hexene, 1-octene, etc.) copolymers, ethylene-propylene and ethylene-propylene-diene monomer rubbers, and the like. The insulation layer is over and in contact with the first semiconductive shield layer.

Second Semiconductive Shield Layer

The second semiconductive shield layer is made from a composition as described above. The second semiconductive shield layer is over and in contact with the insulation layer.

Wire Shield Layer

The wire shield layer typically comprises a wire mesh or metallic tape. The mesh or tape can comprise any metal that provides good electrical conductivity and flexibility, e.g., aluminum. The wire shield layer is over the second semiconductive shield layer. In one embodiment, the wire shield layer is over and in contact with the second semiconductive shield layer.

Protective Jacket

The protective jacket can be made from any polymeric material that provides protection to the wire or cable, ultimately the conductor of the wire or cable, from the elements and physical damage. Typically the protective jacket is also made from a crosslinked polyolefin. In one embodiment, the protective jacket is over the wire shield layer. In one embodiment, the protective jacket is over and in contact with the wire shield layer.

Manufacture

All of the components of the various compositions utilized in the present invention are usually blended or compounded together prior to their introduction into an extrusion device from which they are to be extruded onto a conductor. The polymer and the other additives and fillers may be blended together by any of the techniques used in the art to blend and compound such mixtures to homogeneous masses. For instance, the components may be fluxed on a variety of apparatus including multi-roll mills, screw mills, continuous mixers, compounding extruders and BANBURY™ mixers.

After the various components of the composition to be utilized are uniformly admixed and blended together, they are further processed to fabricate the wire and cable of the present invention. Prior art methods for fabricating polymer insulated cable and wire are well known, and fabrication of the device of the present invention may generally be accomplished any of the various extrusion methods.

In a typical extrusion method, an optionally heated conducting core to be coated is pulled through a heated extrusion die, generally a cross-head die, in which a layer of melted polymer, e.g., the first semiconductive shield layer, is applied to the conducting core. Upon exiting the die, the conducting core with the applied polymer layer is passed through a cooling section, generally an elongated cooling bath, to harden. Multiple polymer layers may be applied by consecutive extrusion steps in which an additional layer, e.g., insulation layer, followed by the second semiconductive shield layer, etc., is added in each step, or with the proper type of die, multiple polymer layers may be applied simultaneously. Nonpolymeric layers, e.g., the wire shield layer, are applied in a conventional manner outside of the extruder, and any overlaying layer, e.g., the protective jacket, then applied using an extruder.

EXAMPLES

Test Methods

DBP Absorption—ASTM D2414-09a Standard Test Method for Carbon Black—Oil Absorption Number (OAN)

Iodine Absorption—ASTM D1510-09b Standard Test Method for Carbon Black-Iodine Adsorption Number Apparent Density—ASTM D1513-05e1 Standard Test Method for Carbon Black, Pelleted—Pour Density Strip Force measurements are conducted on two-layer compression molded specimens containing a semiconductive shield layer and an insulation layer. The two-layer specimens are prepared by first making 8 inch by 8 inch compression molded specimens of the semiconductive insulation shield (0.030 inch thick) and insulation (0.125 inch thick) materials without crosslinking using the method above. Next, the semiconductive insulation shield and insulation plaques are placed in contact in a 0.130 inch mold and compression molded together under low pressure (3.4 MPa) at 125° C. for 3 minutes, and then the press was raised to 182° C. and high pressure (17.2 MPa) for a cure time of 12 minutes. The two-layer plaques are cut into five 1 inch strips. On each 1 inch strip, two parallel cuts are made down toward the insulation with a 0.5 inch separation using a scoring tool designed to remove the insulation shield in strips. The strip force, reported in pounds per one-half inch, is measured with an INSTRON™ Instru-Met model 4201.

Hot creep is measured to determine the degree of cure. Testing is based on the ICEA-T-28-562-2003 method for power cable insulation materials. Hot creep testing is conducted on 50 mil thick samples in an oven with a glass door at 150° C. with a force of 0.2 MPa stress applied to the bottom of the specimens. Three test specimens for each sample are cut using ASTM D 412 type D tensile bars. The samples elongated for 15 minutes where the percentage increase in length is measured and the average values of the three specimens are reported.

Hot Set is used to measure the sample relaxation after hot creep elongation. Testing is based on the ICEA-T-28-562-2003 method for power cable insulation materials. The hot set values are obtained for the same samples undergoing hot-creep testing, after removing the load for 5 minutes under heat and cooling them at room temperature for 10 minutes.

Moving Die Rheometer (MDR) analyses are performed on the compounds using an Alpha Technologies Rheometer MDR model 2000 unit. Testing is based on ASTM D 5289, "Standard Test Method for Rubber—Property Vulcanization Using Rotorless Cure Meters". The MDR analyses are performed using 6 grams of material. Samples are tested at 182° C. for 12 minutes and at 140° C. for 120 minutes at 0.5 degrees arc oscillation for both temperature conditions.

Tensile and Elongation properties are measured on an INSTRON™ Instru-met model 4201 tensile testing machine. The test method used for both tensile and elongation follows ASTM D638. Physical property testing is conducted on 75 mil thick, compression molded plaques before and after heat aging. The sample specimens are placed in a Blue M Electric Company convection oven Model OV-490A and heat aged for 7 days at 136° C.

Volume Resistivity is tested according to ASTM D991. Testing is performed on a 75 mil thick crosslinked plaque. Testing is conducted at room temperature (20-24° C.), 90° C. and 130° C.

Formulations and Sample Preparation

The vulcanizable semiconductive shield composition can be prepared in various types of melt mixers such as BRABENDER™ mixer, BANBURY™ mixer, a roll mill, a BUSS™ co-kneader, a biaxial screw-kneading extruder, and a single or twin-screw extruders. The formulation compositions are shown in the Table. The semiconductive insulation shield compositions in this disclosure are prepared in a BRABENDER™ internal batch mixer at 150° C. and 60 rpm for 5 minutes. The polymer resins, carbon black, and other additives are loaded into the bowl and mixed. The material is removed after 5 minutes for peroxide addition. The material is pelletized and peroxide is soaked into the pellets in a glass jar for 4 hours.

For strip force, electrical and physical property measurements, plaques are compression molded and crosslinked in the press. The samples are pressed under low pressure at 125° C. for 3 minutes, and then high pressure for 3 minutes. Next, the samples are removed, cut into sections, reloaded, and pressed under low pressure at 125° C. for 3 min, and then the press is raised to 182° C. and high pressure for a cure time of 12 minutes. After 12 minutes the press is cooled to 30° C. under high pressure. Once at 30° C., the press is opened and the plaque is removed.

Results

The properties of the compositions are given in the Table. Unlike the Comparative Examples, Inventive Examples 1A-1, 1B-1, 2A-2E, and 5-7 exhibited the desired combination of properties (shown above in section B4) for the manufacture and use of a crosslinkable, semiconductive insulation shield for use in medium-voltage power cables: typically 50% or more lower adhesion over a commercially available EPR insulation compound; acceptably high MDR-MH and low hot creep at elevated temperature (for cross-linking after extrusion); acceptably high ts1 (for scorch-resistance during extrusion); sufficiently low volume resistivity (electrical property); and adequate tensile strength and elongation physical properties before and after heat aging.

Comparative Examples 1, 2 and 5-7 utilized the amine antioxidant yielding higher adhesion as compared to the examples utilizing the phenolic antioxidant. Comparative Examples 3 and 4 are comparative because these compositions do not achieve the desired level of crosslink density i.e. high hot creep and low MDR. Unlike Inventive Example 1A-1 and 1B-1 with phenolic antioxidant 1 and 2 respectively, Comparative Example 1B-2 do not improve the adhesion despite being based on phenolic antioxidant 3. Inventive Examples 5-7 contain the phenolic antioxidant with varying nitrile rubbers and show lower adhesion compared to the same formulations with the amine antioxidant in Comparative Examples 5-7.

Inventive Example 1A-1 demonstrates the reduction in adhesion of the semiconductive insulation shield over EPR insulation and balance of properties achieved with a phenolic antioxidant as compared to Comparative Example 1 with an amine-based antioxidant. These two examples are produced with an EVA polymer containing 31.5 percent VA by weight.

Inventive Examples 2A-2E demonstrate the reduction in adhesion of the semiconductive insulation shield over EPR insulation and balance of properties achieved with a phenolic antioxidant as compared to Comparative Examples 2-4 with an amine-based antioxidant. These examples are produced with an EVA polymer containing 40 percent VA by weight.

The use of an EVA with 40 percent VA by weight results in even more of a reduction of adhesion as shown by comparing Comparative Example 1 with Comparative Example 2 and Inventive Example 2D with Inventive Example 1A-1.

| Composition (wt %) | Comp Exp 1 | Comp Exp 2 | Comp Exp 3 | Comp Exp 4 | Exp. 2A | Exp 2B | Exp 2C | Exp 2D | Exp 2E | Comp Exp 5 | Comp Exp 6 | Comp Exp 7 | Exp 5 | Exp 6 | Exp 7 | Exp 1A-1 | Exp 1B-1 | Comp Exp 1B-2 |
|---|---|---|---|---|---|---|---|---|---|---|---|---|---|---|---|---|---|---|
| Component A: 33% VA - EVA (31% VA, 33MI) | 52.2 | | | | | | | | | | | | | | | | | |
| Component A: 40% VA - EVA (40% VA, 3MI) | | 51.2 | 51.7 | 51.3 | 51.3 | 51.7 | 51.3 | 51.5 | 56.5 | 52.2 | 52.2 | 52.2 | 51.5 | 51.5 | 51.5 | 51.5 | 51.5 | 51.5 |
| Component B: Carbon Black | 36 | 37 | 37 | 37 | 37 | 37 | 37 | 37 | 37 | 36 | 36 | 36 | 37 | 37 | 37 | 37 | 37 | 37 |
| Component C: NBR 1 (33% ACN) | 10 | 10 | 10 | 10 | 10 | 10 | 10 | 10 | 5 | | | | | | | 10 | 10 | 10 |
| Component C: NBR 2 (40.5% ACN) | | | | | | | | | | 10 | | | | | | | | |
| Component C: NBR 3 (40% ACN) | | | | | | | | | | | 10 | | 10 | | | | | |
| Component C: NBR 4 (44% ACN) | | | | | | | | | | | | 10 | | 10 | 10 | | | |
| Component D: Amine Antioxidant | 0.8 | 0.8 | | | | | | | | | | | | | | | | |
| Component D: Phenolic Antioxidant 1 (2,2'-Methylenebis(6-tert-butyl-4-methylphenol)) | | | 0.3 | 0.7 | 0.7 | 0.3 | 0.7 | 0.5 | 0.5 | | | | | | | 0.5 | | |
| Component D: Phenolic Antioxidant 2 (4,4'-Thiobis (3-methyl-6 tert-butylphenol) | | | | | | | | | | 0.8 | 0.8 | 0.8 | 0.5 | 0.5 | 0.5 | | | |
| Component D: Phenolic Antioxidant 3 (Pentaerythritol tetrakis(3-(3,5-di-tert-butyl-4-hydroxyphenyl)propionate)) | | | | | | | | | | | | | | | | | 0.5 | 0.5 |
| Fatty Acid Wax | | | | | | | | | | | | | | | | | | |
| Above Intermediate | 1 | 1 | 1 | 1 | 1 | 1 | 1 | 1 | 1 | 1 | 1 | 1 | 1 | 1 | 1 | 1 | 1 | 1 |
| Component E: Organic Peroxide | 99.3 / 0.7 | 99.3 / 0.7 | 99.6 / 0.4 | 99.6 / 0.4 | 99.3 / 0.7 | 99 / 1 | 99 / 1 | 99.3 / 0.7 | 99.3 / 0.7 | 99.3 / 0.7 | 99.3 / 0.7 | 99.3 / 0.7 | 99.3 / 0.7 | 99.3 / 0.7 | 99.3 / 0.7 | 99.3 / 0.7 | 99.3 / 0.7 | 99.3 / 0.7 |
| Adhesion and Physical Properties | | | | | | | | | | | | | | | | | | |
| Adhesion on EPR, Peak (lb/0.5") | 19.0 | 11.2 | 5.4 | 3.6 | 5.5 | 8.4 | 5.4 | 6.2 | 6.9 | 23.9 | 22.5 | 25.1 | 16.9 | 18.9 | 19.5 | 13.8 | 17.6 | 28.8 |
| Tensile Strength at Break, psi | 1859 | 1907 | 1319 | 1275 | 1614 | 2152 | 1517 | 1514 | 1454 | 1782 | 1605 | 1792 | 1532 | 1413 | 1528 | 1650 | 1467 | 2071 |
| Aged Ten Strength at Break, psi | 2009 | 2053 | 1334 | 1235 | 1910 | 1936 | 1585 | 1612 | 1647 | 1701 | 1581 | 1706 | 1474 | 1495 | 1531 | 1656 | 1568 | 1904 |
| Aged Elongation, % | 308 | 274 | 345 | 338 | 267 | 269 | 249 | 292 | 310 | 246 | 227 | 220 | 227 | 254 | 266 | 265 | 221 | 269 |
| Retained Elongation, % | 209 | 174 | 211 | 191 | 164 | 208 | 209 | 226 | 278 | 176 | 210 | 194 | 149 | 140 | 138 | 172 | 143 | 163 |
| Cure Properties | | | | | | | | | | | | | | | | | | |
| MDR-MH, in-lb (182 C., 12 min) | 7.81 | 7.66 | 3.55 | 3.33 | 5.52 | 10.99 | 5.81 | 6.38 | 4.64 | 6.45 | 6.87 | 6.61 | 5.89 | 5.71 | 6.46 | 5.77 | 6.53 | 10.75 |
| MDR-ts1, min (140 C., 2 hr) | 18.49 | 17.40 | 15.60 | 22.25 | 24.68 | 34.07 | 17.28 | 17.40 | 23.81 | 14.29 | 21.85 | 21.45 | 20.5 | 26.07 | 22.63 | 24.68 | 22.5 | 12.73 |
| Hot Creep, % (150 C., 20 N) | 19.31 | 16.37 | 72.79 | Failed | 30.47 | 9.62 | 17.85 | 25.02 | 41.48 | 26.6 | 22.5 | 16.5 | 21.0 | 36.5 | 35 | 31.50 | 33.5 | 11.0 |

-continued

| Composition (wt %) | Comp Exp 1 | Comp Exp 2 | Comp Exp 3 | Comp Exp 4 | Exp. 2A | Exp 2B | Exp 2C | Exp 2D | Exp 2E | Comp Exp 5 | Comp Exp 6 | Comp Exp 7 | Exp 5 | Exp 6 | Exp 7 | Exp 1A-1 | Exp 1B-1 | Comp Exp 1B-2 |
|---|---|---|---|---|---|---|---|---|---|---|---|---|---|---|---|---|---|---|
| | | | | | | | Electrical Properties | | | | | | | | | | | |
| Volume Resistivity, 23 C. | 58 | 708 | 11389 | 107137 | 4544 | 30099 | 36871 | 8620 | 37139 | 116 | 63 | 101 | 66 | 53 | 70 | 1400 | 86 | 38 |
| Volume Resistivity, 90 C. | 49 | 537 | 4179 | 8533 | 2662 | 5534 | 8970 | 3810 | 8590 | 251 | 166 | 169 | 163 | 209 | 236 | 984 | 243 | 79 |
| Volume Resistivity, 130 C. | 449 | 1226 | 3315 | 5633 | 895 | 3245 | 977 | 2391 | 12969 | 271 | 96 | 99 | 164 | 125 | 147 | 348 | 150 | 66 |

What is claimed is:

1. A composition consisting of in weight percent based on the weight of the composition:
    (A) 45-52% ethylene vinyl acetate (EVA) comprising 31% units derived from vinyl acetate (VA) based on the weight of the EVA;
    (B) 34-41% carbon black having
        (1) 80-115 milliliters per 100 grams (ml/100 g) DBP absorption value,
        (2) 30-60 milligrams per gram (mg/g) iodine absorption (I2NO), and
        (3) 0.3-0.6 grams/milliliter (g/ml) apparent density;
    (C) 8-19% acrylonitrile butadiene rubber (NBR) comprising 30-50% units derived from acrylonitrile (AN) based on the weight of the NBR;
    (D) 0.4-1% phenolic antioxidant of 2,2'-methylenebis(6-tert-butyl-4-methylphenol);
    (E) 0.7-1.4% organic peroxide; and
    (F) optionally wax.

2. The composition of claim 1 in which the organic peroxide is one or more of a dialkyl peroxide and a diperoxyketal.

3. The composition of claim 1 further comprising one or more filler or additive.

4. A wire or cable comprising an insulation layer and a semiconducting shield layer over and in contact with the insulation layer, the shield layer made from the composition of claim 1.

5. A wire or cable comprising:
    (A) a conductor;
    (B) a first semiconducting shield layer over and in contact with the conductor;
    (C) an insulation layer over and in contact with the first semiconducting shield layer;
    (D) a second semiconducting shield layer over and in contact with the insulation layer, the second semiconducting shield layer made from the composition of claim 1;
    (E) a wire shield over the second semiconducting shield layer; and
    a protective jacket.

6. The wire or cable of claim 4 which the insulation layer comprises a crosslinked polyolefin.

7. The wire or cable of claim 4 which the insulation layer comprises a crosslinked ethylene-propylene-diene monomer rubber.

8. The wire or cable of claim 5 which the insulation layer comprises a crosslinked polyolefin.

9. The wire or cable of claim 5 which the insulation layer comprises a crosslinked ethylene-propylene-diene monomer rubber.

10. The composition of claim 9 wherein the composition has a moving die rheometer value from 5.71 inch-pound to 6.46 inch-pound as measured in accordance with ASTM D 5289 at 182° C. for 12 minutes.

11. The composition of claim 10 wherein the composition has a strip force from 13.8 pounds per half-inch to 19.5 pounds per half-inch.

12. A composition consisting of in weight percent based on the weight of the composition:
    (A) 45-52% ethylene vinyl acetate (EVA) comprising 40% units derived from vinyl acetate (VA) based on the weight of the EVA;
    (B) 34-41% carbon black having
        (1) 80-115 milliliters per 100 grams (ml/100 g) DBP absorption value,
        (2) 30-60 milligrams per gram (mg/g) iodine absorption (I2NO), and
        (3) 0.3-0.6 grams/milliliter (g/ml) apparent density;
    (C) 8-19% acrylonitrile butadiene rubber (NBR) comprising 30-50% units derived from acrylonitrile (AN) based on the weight of the NBR;
    (D) 0.4-1% phenolic antioxidant of 2,2'-methylenebis(6-tert-butyl-4-methylphenol); and
    (E) 0.7-1.4% organic peroxide; and
    (F) optionally wax.

13. The composition of claim 12 wherein the composition has a moving die rheometer value from 4.64 inch-pound to 6.38 inch-pound as measured in accordance with ASTM D 5289 at 182° C. for 12 minutes.

14. The composition of claim 13 wherein the composition has a strip force from 5.4 pounds per half-inch to 6.9 pounds per half-inch.

* * * * *